(12) United States Patent
van Os et al.

(10) Patent No.: US 8,283,546 B2
(45) Date of Patent: Oct. 9, 2012

(54) MELODY ENCODING AND SEARCHING SYSTEM

(76) Inventors: Jan L. van Os, Voorburg (NL); Florian U. Bomers, Munich (DE)

(*) Notice: Subject to any disclaimer, the term of this patent is extended or adjusted under 35 U.S.C. 154(b) by 962 days.

(21) Appl. No.: 11/692,650

(22) Filed: Mar. 28, 2007

(65) Prior Publication Data
US 2008/0236366 A1 Oct. 2, 2008

(51) Int. Cl.
*G10H 1/00* (2006.01)

(52) U.S. Cl. .................. 84/609; 84/600; 84/649

(58) Field of Classification Search ............ 84/600–602, 84/609, 649
See application file for complete search history.

(56) References Cited

U.S. PATENT DOCUMENTS

| | | | |
|---|---|---|---|
| 4,690,025 A | 9/1987 | Hines et al. | |
| 4,958,551 A | 9/1990 | Lui | |
| 4,999,773 A * | 3/1991 | Clynes ................ | 84/622 |
| 5,146,833 A | 9/1992 | Lui | |
| 6,121,530 A | 9/2000 | Sonoda | |
| 6,188,010 B1 | 2/2001 | Iwamura | |
| 6,201,176 B1 * | 3/2001 | Yourlo ................ | 84/609 |
| 6,678,680 B1 | 1/2004 | Woo | |
| 6,747,201 B2 * | 6/2004 | Birmingham et al. ... | 84/609 |
| 7,053,291 B1 * | 5/2006 | Villa .................. | 84/609 |
| 7,227,072 B1 * | 6/2007 | Weare ................ | 84/609 |
| 7,277,852 B2 * | 10/2007 | Iyoku et al. ........... | 704/236 |
| 7,288,710 B2 * | 10/2007 | Gayama ............... | 84/609 |
| 7,342,167 B2 * | 3/2008 | Cremer et al. ......... | 84/611 |
| 2002/0094804 A1 | 7/2002 | Shibata et al. | |
| 2003/0089216 A1 * | 5/2003 | Birmingham et al. ... | 84/609 |
| 2005/0005760 A1 | 1/2005 | Hull et al. | |
| 2005/0176425 A1 | 8/2005 | Kawakami et al. | |
| 2006/0065105 A1 | 3/2006 | Iketani et al. | |
| 2006/0075881 A1 | 4/2006 | Streitenberger et al. | |
| 2006/0075883 A1 * | 4/2006 | Thorne et al. .......... | 84/616 |
| 2006/0075884 A1 | 4/2006 | Streitenberger et al. | |
| 2006/0179052 A1 | 8/2006 | Pauws et al. | |
| 2007/0044642 A1 | 3/2007 | Schierle | |
| 2007/0131094 A1 * | 6/2007 | Kemp ................. | 84/609 |
| 2007/0214941 A1 * | 9/2007 | Kourbatov ............ | 84/609 |

OTHER PUBLICATIONS

Classical Music Search website (http://iwamura.home.znet.com/kbdif/kbdif.html).
C Brahms Retrieval Engine for Melody Searching website (http://iwamura.home.znet.com/kbdif/kbdif.html).
Melody Suchmachine website (http://www.musicline.de/de/melodiesuche/input).
Musipedia website (http://www.musipedia.org/home.0.html).

(Continued)

*Primary Examiner* — David S. Warren
(74) *Attorney, Agent, or Firm* — Murphy, Bilak & Homiller, PLLC (57) ABSTRACT

An input sequence of musical notes is converted to a melodic contour by detecting note interval changes, e.g., in semitones, between consecutive musical notes in the sequence and mapping the detected note interval changes to corresponding change codes in a defined set of change codes, which have non-uniform step sizes for quantizing note interval changes. Correspondingly, a system, such as a local and/or a remote computer system system (e.g., a web-based melody search server) compares input melodic contours with a database of stored melodic contours to determine matching information, which can be provided to the users that generated the input sequences of musical notes. The system may be configured to search computer networks to identify audio files for representation in the database of stored melodic contours. Further, an embodiment provides for a graphical keyboard for entry of musical note sequences and/or provides for receiving such sequences through a MIDI port.

25 Claims, 6 Drawing Sheets

OTHER PUBLICATIONS

New Zealand Digital Library website (http://www.nzdl.org/fast-cgi-bin/music/musiclibrary).
Themefinder website (http://www.themefinder.org/).
Tunespotting website (http://tunespotting.com/).
Parfait Ole website (http://www.parfaitole.com/).

Mills, Elinor. "This Web Site Can Name That Tune." CNET News.com, Jan. 26, 2007 (http://news.com.com/This+Web+site+can+name+that+tune/2100-1027_3-6153657.html ).
Midomi website (http://www.midomi.com).

* cited by examiner

MELODY ENCODING AND SEARCHING SYSTEM

BACKGROUND

The present invention generally relates to digital music, and more particularly relates to encoding and searching for digital music based on the tune or melody.

The proliferation of digital music files has led to vast resources being available to individuals seeking music. Files are available in many formats, including the very popular MP3 format, but other popular formats include MIDI formatted files and specialized formats encompassing a range of musical works from complex compositions to simple ring tones for portable cellular telephones.

Listeners have a plethora of resources to find music via text search engines within their own music libraries or on the Internet. These traditional search methods generally work, however, when the listener knows text-based information that might identify the music. When a listener only remembers the tune in his head, rather than the title or artist or other textual identification, there are few easy-to-use resources available to identify the music.

An individual may hear music on the radio or in a public establishment, but not get the identifying information, and later want to acquire any number of related products such as a Compact Disc recording, sheet music, or a ring tone for his or her phone. Without textually identifying information, the music fan generally has no good way of identifying the particular composition of interest.

Some existing methods available via the internet, for example, do permit melody-based searching. However, current approaches to melody-based searching do not strike a balance between ease-of-use and accuracy of results. For example, some existing melody search tools use melody encoding schemes so general as to yield too many matches. Others use encoding schemes so exacting that minor input errors by their users exclude the music sought.

SUMMARY

In one or more method embodiments taught herein, a method of generating a melodic contour comprises storing a set of change codes having non-uniform step sizes in semitones to quantize note interval changes (e.g., in semitones) between consecutive musical notes in any given sequence of musical notes, wherein different change codes in the set of change codes represent different counts or ranges of note interval changes. Making use of this stored set of change codes, the method further includes receiving an input sequence of musical notes, and generating the melodic contour as a particular sequence of the change codes determined by detecting note interval changes between successive musical notes in the input sequence of musical notes and mapping the detected note interval changes to corresponding ones of the change codes.

In the same or other embodiments, a method of melody matching based on melodic contours comprises defining the melodic contour for any given sequence of musical notes as the corresponding sequence of change codes selected from a defined set of change codes having non-uniform step sizes that quantize note interval changes between consecutive musical notes in the given sequence of musical notes, and comparing an input melodic contour for an input sequence of musical notes to a database of stored melodic contours to determine matching information indicating whether or to what extent the input melodic contour matches one or more of the stored melodic contours. The method further includes providing the matching information to a user associated with the input melodic contour.

Thus, in at least one embodiment taught herein a system for melody matching comprises means for maintaining a database of stored melodic contours and means for converting an input sequence of musical notes entered by a user into a corresponding input melodic contour. Such means is based on detecting note interval changes between consecutive musical notes in the input sequence of musical notes and mapping the detected note interval changes to corresponding ones in a defined set of change codes having non-uniform step sizes for quantizing note interval changes. Further, the system includes means for generating matching information based on comparing the input melodic contour to the database of stored melodic contours, and means for providing the matching information to the user.

As a non-limiting example, the system may comprise a stand-alone computer system executing computer program code supporting entering input sequences of musical notes, generating corresponding input melodic contours, comparing of input melodic contours with a database of stored melodic contours, and providing matching information based on that comparison. Of course, in at least one embodiment, some or all such processing is performed by computer program code executing on a remote computer, e.g., a web server, that is configured to act as a melody search server. In such embodiments, a local computer is configured to receive an input sequence of notes and send that sequence to the remote computer, which is configured to convert the sequence into the corresponding melodic contour, search one or more databases of stored melodic contours for entries matching the input melodic contour, and to return corresponding matching information to the local computer. Note, too, that the local computer can generate the melodic contour and send that to the remote computer.

In such embodiments, the computer program code executing on the remote computer may include program instructions configuring the remote computer to act as a web crawler, wherein it searches one or more computer networks—e.g., the internet at large or selected internet domains—for repositories of one or more targeted file types. As such, the remote computer is configured to automatically build and maintain databases of stored melodic contours and it can be configured to store corresponding identifying information (e.g., song/file names, locations, hyperlinks, etc.), which can be returned to users as part of the matching information.

Further, in at least one embodiment, a graphical representation of a musical keyboard is displayed on a user's computer screen and enables the user to input a desired sequence of musical notes. Computer program code to present this display may be stored on the user's computer, may be remotely hosted by a remote computer, or may be downloaded as an applet to the user's computer. Program code also may be included for displaying a graphical representation of the input melodic contour generated from any given input sequence of musical notes, thereby providing graphical feedback to the user. Further, program code also may be included for monitoring a MIDI port of the user's computer, thereby enabling entry of musical note sequences via attached musical instruments, for example.

Thus, the system may include means for obtaining the input sequence of musical notes as user-directed input wherein such means comprise, for a given user, a mobile device having a user interface configured for receiving user input indicating or otherwise defining the input sequence of musical notes. In at least one such embodiment, a display screen of a mobile device, which may be, for example, a cellular telephone, Portable Digital Assistant, etc., depicts a facsimile of a musical keyboard or other note-entry device, which allows the user to input musical notes.

Thus, in one embodiment, the system may comprise a web server or other networked computer accessible to a plurality of users via their respective mobile computing devices. Those devices may, in one embodiment, simply provide means for inputting sequences of musical notes, means for sending those input sequences to the networked computer for melodic contour generation and melody matching comparison, and means for receiving/displaying returned matching results. In another embodiment, the mobile computing devices may store the change codes used for melodic contour generation, such that they generate input melodic contours from input sequences of musical notes, and send the input melodic contours to the networked computer for melody matching comparisons.

Of course, the present invention is not limited to the above features and advantages. Indeed, those skilled in the art will recognize additional features and advantages upon reading the following detailed description and upon viewing the accompanying drawings.

DETAILED DESCRIPTION

In one or more embodiments taught herein, a method of generating a melodic contour comprises storing a set of change codes having non-uniform step sizes in semitones to quantize note interval changes between consecutive musical notes in any given sequence of musical notes, wherein different change codes in the set of change codes represent different counts or ranges of note interval changes. The method further includes receiving an input sequence of musical notes and generating the melodic contour as a particular sequence of the change codes determined by detecting note interval changes, e.g., in semitones, between successive musical notes in the input sequence of musical notes and mapping the detected note interval changes to corresponding ones of the change codes.

In one or more embodiments, storing the set of change codes comprises storing a first subset of change codes corresponding to upward note interval changes, and a second subset of change codes mirroring the step sizes of the first subset of change codes but corresponding to downward note interval changes. That is, the change codes include change codes corresponding to different ranges of upward note interval changes, and change codes corresponding to different ranges of downward note interval changes.

For example, in at least one embodiment, storing the set of change codes comprises storing a first up code representing an upward note interval change of one to two semitones, a second up code representing an upward note interval change of three to five semitones, and a third up code representing an upward note interval change of six or greater semitones, and further comprises storing corresponding first, second, and third down codes.

Such embodiments also may include storing one or more repeat codes as part of the set of change codes, each repeat code representing a different number or range of consecutively repeated musical notes. For example, the method may include storing a first repeat code corresponding to two to three identical musical notes in a row, storing a second repeat code corresponding to four to five identical notes in a row, and storing a third repeat code corresponding to six or more identical musical notes in a row.

Also, one or more embodiments may use change codes that support the generation of different resolutions of melodic contours, e.g., a higher-resolution melodic contour and a lower-resolution melodic contour. These differing resolutions of melodic contours may be used in performing melodic contour searches with differing levels of preciseness in terms of matching, e.g., narrow searching and broad searching.

For example, in at least one embodiment taught herein, storing the set of change codes for generation of the input melodic contour from an entered sequence of musical notes comprises storing two different sets of change codes. The two different sets include a higher-resolution set and a lower-resolution set. Thus, generating the melodic contour comprises using the higher-resolution set of change codes to generate a higher-resolution input melodic contour from the input sequence of musical notes and using the lower-resolution set of change codes to generate a lower-resolution input melodic contour from the input sequence of musical notes or from the higher-resolution input melodic contour. (In this latter case, lower-resolution melodic contours can be generated from higher-resolution melodic contours, such as by mapping the higher-resolution change codes of the higher-resolution melodic contour into the lower-resolution change codes.)

With these differing resolutions of melodic contours, the method of melodic contour generation may further include performing higher-resolution comparison matching by comparing the higher-resolution input melodic contour with one or more of higher-resolution stored melodic contours in a database of stored melodic contours, and performing lower-resolution comparison matching by comparing the lower-resolution input melodic contour with one or more of lower-resolution stored melodic contours in a same or different database of stored melodic contours. Alternatively, the method may include performing lower-resolution comparison matching by comparing the lower-resolution input melodic contour with one or more lower-resolution melodic contours derived by mapping higher-resolution stored melodic contours from a database of stored melodic contours to the lower-resolution of the lower-resolution input melodic contour.

The higher-resolution melodic contours support narrower searching in that they require closer or more detailed matching between the input melodic contour and entries in the stored database of melodic contours. Conversely, the lower-resolution melodic contours, which may be generated by mapping high resolution melodic contours into the lower resolution quantization space represented by the lower-resolution change codes, support broader, less precise searching. Broad searching may be desired as an initial step to identify a subset of stored melodic contours to use for more precise, narrow searching, or may be desired when an initial narrow search produces identifies none or a few matches.

With the above in mind, one or more method embodiments contemplated herein store high and low resolution versions of the database of stored melodic contours, and the appropriate database version can be selected as needed. That is, in at least some cases, it may be more efficient to store separate melodic contours of differing resolutions for each given song or other digital audio file represented in the database, so that searching can be done at the appropriate or desired resolution. In other instances, it may be desired to store a high-resolution melodic contour for each song or other digital audio file represented in the database and then map these high-resolution melodic contours as needed to lower resolutions appropriate for the resolution of the input melodic contour of interest.

Regardless of whether low and high resolution options are provided or included, one or more embodiments taught herein provide a graphical user interface that includes a keyboard graphic enabling a user to enter the sequence of musical notes and a melodic contour display that displays the melodic contour according to the step sizes defined by the set of change codes used to generate the melodic contour. For example, computer program code executing on a user's local computer includes program instructions causing a graphical representation of a musical keyboard to be displayed for entry of the input sequence of musical notes, and further causes a graphical representation of the correspondingly generated melodic contour to be displayed.

Figure 1:
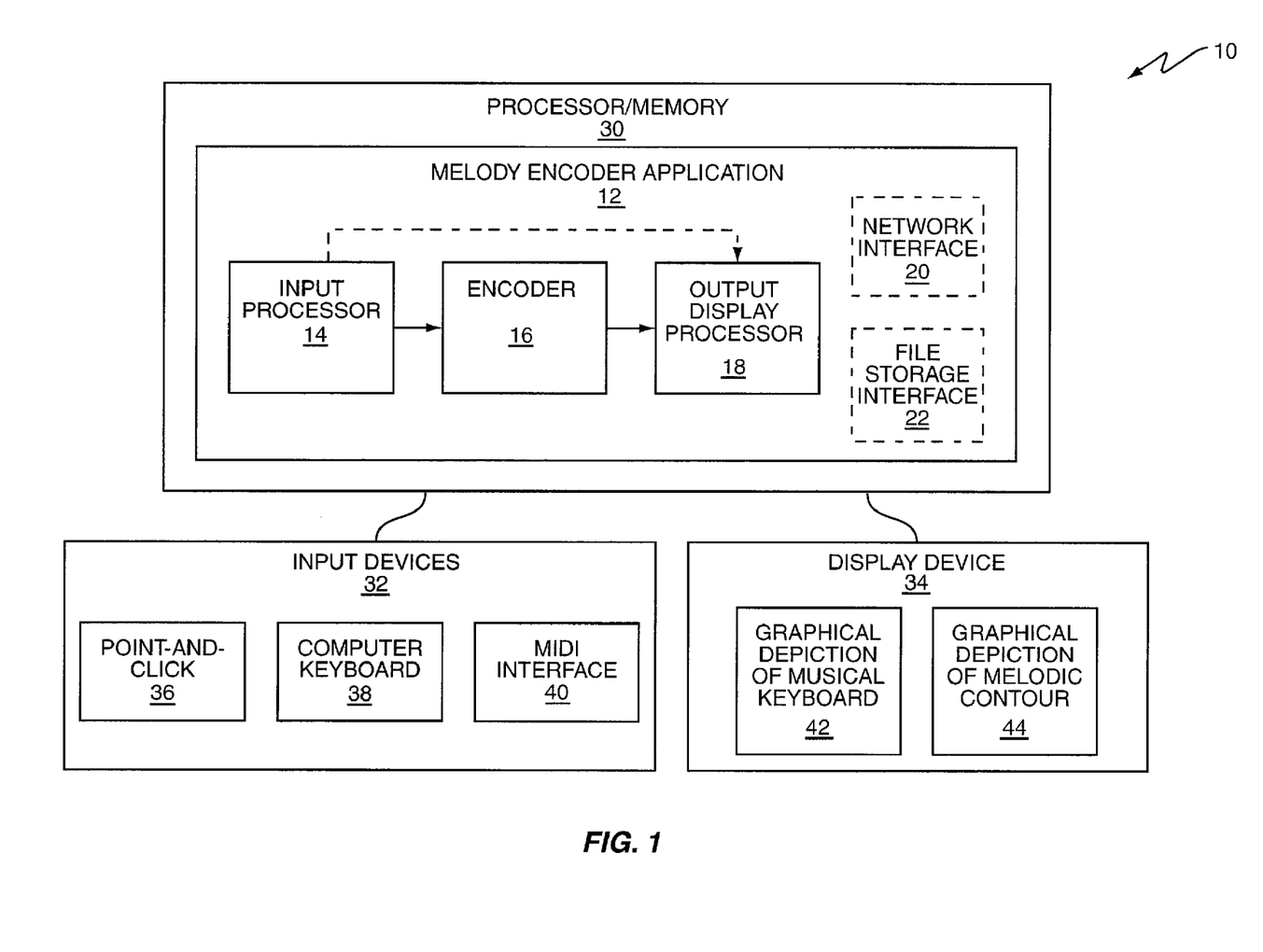
FIG. 1 is a block diagram of one embodiment of a computer program embodying a method of melodic contour generation.

With the above non-limiting examples in mind, FIG. 1 illustrates one embodiment of a computer system 10, which is configured to execute a computer program 12 that embodies a method of generating melodic change codes for sequences of entered notes and, in at least one embodiment, provides database search capabilities that allow a user to identify or otherwise locate digital audio files having matching melodic contours. To those ends, the illustrated embodiment of the computer program 12 comprises an input processor 14, an encoder 16, an output display processor 18, and optional network and file storage interfaces 20 and 22, respectively. Corresponding program instructions included in the computer program 12 embody these illustrated functional elements, and such an arrangement of functional elements can be varied as needed or desired without departing from the broader method.

The computer system 10 comprises, for example, a personal computer (PC) running WINDOWS, OS X, or other operating system, and includes processor/memory systems 30 and includes or is associated with one or more input and display devices 32 and 34, respectively. In the illustrated embodiment, the input devices 32 include a mouse or other pointing device 36, a computer keyboard 38, and an optional Musical Instrument Digital Interface (MIDI) 40. Further, the illustrated display device 34, e.g., a computer monitor, allows the computer program 12 to display graphical depictions of a musical keyboard 42 and melodic contour 44. These graphical depictions aid the user's entry and optional editing of musical notes for melodic contour coding, such as illustrated in FIG. 2.

Figure 2:
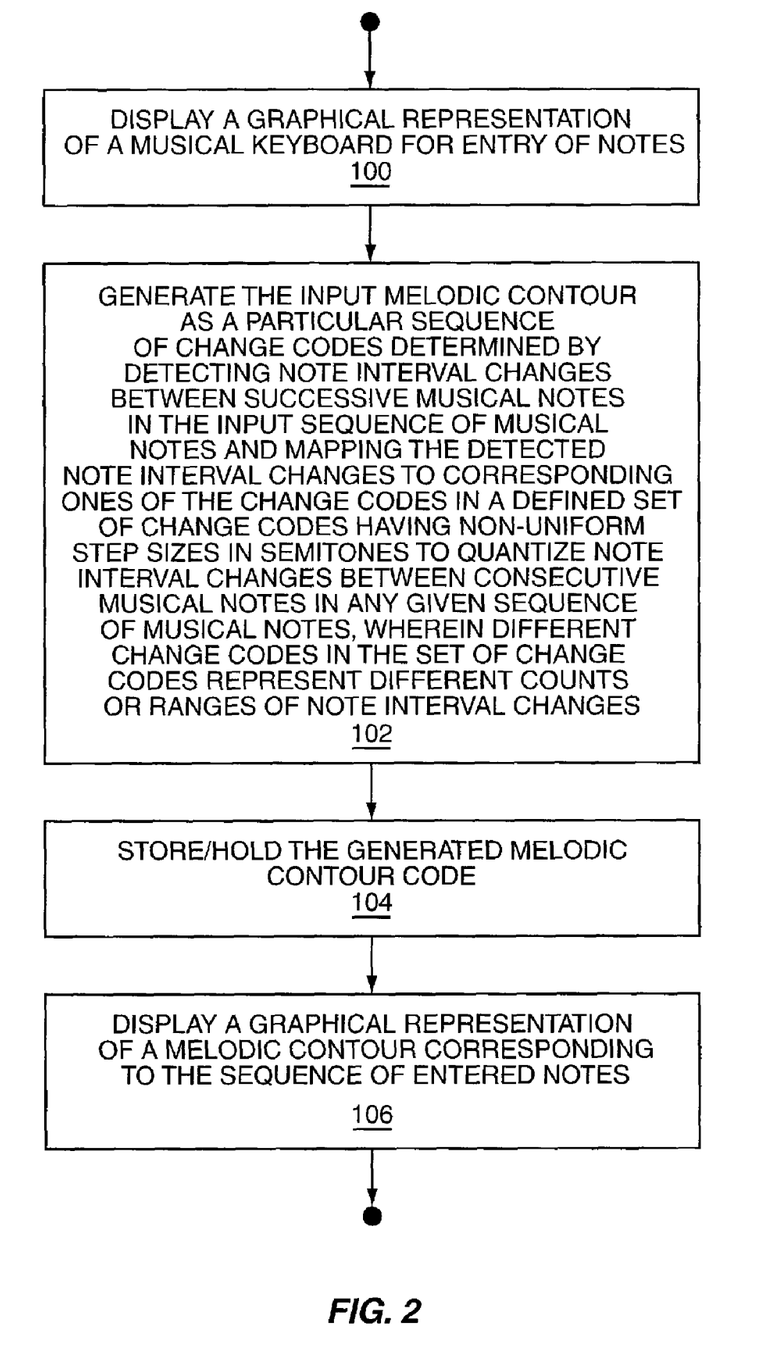
FIG. 2 is a logic flow diagram of one embodiment of processing logic for melodic contour coding.

Processing to support the method of melodic contour coding illustrated in FIG. 2 "begins" with displaying a graphical representation of a musical keyboard for entry of notes (Step 100). Processing continues with generating an input melodic contour as a particular sequence of change codes determined by detecting note interval changes between successive musical notes in the user-entered sequence of musical notes and mapping the detected note interval changes to corresponding ones of the change codes (in a defined set of change codes) (Step 102). Such processing may be supported by storing a set of change codes having non-uniform step sizes in semitones to quantize note interval changes between consecutive musical notes in any given sequence of musical notes, wherein different change codes in the set of change codes represent different counts or ranges of note interval changes.

In more detail, processing in this respect includes or is based on defining the melodic contour for any given sequence of musical notes as the corresponding sequence of change codes selected from a defined set of change codes having non-uniform step sizes that quantize note interval changes between consecutive musical notes in the given sequence of musical notes. The computer program 12 thus includes instructions or data for storing a set of change codes having non-uniform step sizes to quantize note interval changes in semitones between consecutive musical notes in any given sequence of musical notes, wherein different change codes in the set of change codes represent different counts or ranges of note interval changes. As will be explained later, such code and/or definitions may be stored on a remote computer, as well.

In any case, the computer program 12 generates the input melodic contour by detecting the note interval changes between consecutive musical notes in the input sequence of musical notes and mapping the detected note interval changes to corresponding change codes in the defined set of change codes. In at least one embodiment, the change codes comprise a subset of up change codes corresponding to upward note interval changes and a corresponding subset of down change codes corresponding to downward note interval changes. For example, significant experimentation supporting the method and system embodiments herein indicate good performance and desirable reduction in melodic contour code complexity by defining a first up (down) change code for upward (downward) note interval changes of 1 to 2, a second up (down) change code for upward (downward) note interval changes of 3 to 5, and a third up (down) change code for upward (downward) note interval changes of 6 or greater.

Further, experimentation demonstrates that the change code interval definitions—i.e., the number of defined change codes and the non-uniform quantization steps sizes represented by those change codes—can be tailored for a particular style or styles of music. By adapting the change code definitions to the general characteristics of the digital audio files for which melodic contours are stored in the database, one can optimize matching performance, or at least optimize matching performance for given tradeoffs in code complexity. Thus, in at least one embodiment taught herein, it is contemplated that computer software uses different change code definitions for different styles of music. In at least one such embodiment, change code definitions are automatically selected or adapted for a given style of music or a given type of audio content to which melody searching activities pertain. In another embodiment, the change code definitions are modifiable or otherwise selectable by the user, to tune or tailor performance.

Still further, melodic contour coding and searching as taught herein contemplates "fuzzy logic" based approaches. For example, change codes may be defined in such a way that a case sensitive contour search will give more precise results than a case-insensitive search. By way of non-limiting example, the following case-sensitive encoding protocol may be used (irrespective of whether encoding is performed locally or remotely): lower case "d": 1 or 2 note intervals down; upper case "D": 3 or more note intervals down; lower case "s": 1-2 repeated notes; uppercase "S": 3 or more repeated notes; lowercase "u": 1 or 2 note intervals up; uppercase "U": 3 or more note intervals up. Of course, a more complicated, higher-resolution scheme may be employed along the same lines, such as where additional upper/lower case letters are used to encode further step size ranges of up and down interval changes, e.g., u=1 to 2 semitones up, U=3 semitones up, j=4 to 5 semitones up, and J=6 or more semitones up. (The same extended resolution scheme may be applied to downward interval changes, such as by using "d," "D," "f" and "F," and to repeat codes.)

With the above encoding example, the same change codes stored for a melodic contour support two or more levels of search precision or fuzziness. That is, those skilled in the art will appreciate that a case-insensitive search will treat "d" the same as "D", "u" the same as "U", and so on. Conversely, a case-sensitive search will differentiate between upper and lowercase code values. Note that a case insensitive search with the above encoding example effectively uses the Parson's Code, so actual implementations contemplated herein generally will use more refined encodings with at least two or more change codes for upward changes and likewise for downward changes.

In another embodiment of fuzzy encoding/searching, a melodic contour database stores multiple encodings for each melody represented in the database. With that approach, a search for the same song or melody can be made for different change code representations of an input melodic contour, yielding different levels of accuracy/fuzziness.

In any case, one or more embodiments of the computer program 12 permit the user simply to enter notes using the displayed musical keyboard 42, while one or more other embodiments allow the user to enter notes additionally or alternatively using an attached musical instrument (via the MIDI port 40). In still other embodiments, the computer program 12 is adapted to process files or other data structures—e.g., stored digital audio files containing MIDI compositions, ring tones, MP3 or other audio content, etc.—that contain one or more sequences of notes.

With the above examples and variations in mind, processing in FIG. 2 continues with storing the quantized note interval changes as the melodic contour for the sequence of entered notes (Step 104), and displaying a graphical representation of the melodic contour 44 corresponding to the sequence of entered notes (Step 106). In other words, the detected note interval changes for the given input sequence of musical notes are mapped into one or more sets of change codes, and the computer program 12 provides a graphical representation of the resulting input melodic contour. In at least one embodiment, the computer program 12 is configured to display a set of graphical elements, such as slider-type controls set on a vertical pitch scale, and then adjust or correct the relative display positions of these elements to suggest the melodic contour of the entered sequence of notes. Notably, the slider controls are, in one or more embodiments, responsive to user input, and provide a convenient and intuitive input control mechanism for the user to modify or otherwise change the melodic contour. Complementing this control input, the computer program 12 dynamically revises the input melodic contour stored in memory in response to slider-control input changes by the user.

Thus, in at least one such embodiment, the computer program 12 includes program instructions to adjust or otherwise revise the input melodic contour generated for the entered sequence of notes, in response to user input directed to the graphical depiction of melodic contour 44. For example, the computer program 12 may be configured to allow the user to click-and-drag individual ones of the graphical elements comprising the graphical depiction of melodic contour 44, and to make adjustments to corresponding ones of the quantized note interval changes in the input melodic contour. Such adjustments may be made on a copy of the input melodic contour as held in local memory, or as written to a permanent file storage system, and the computer program 12 may include "undo" and other features allowing the user to reverse or otherwise change any adjustment made to the input melodic contour. Further, the computer program 12 may support playback of the entered sequence of notes, and the computer system 10 may include an audio card and speakers (not shown) to support such playback.

Figure 3:
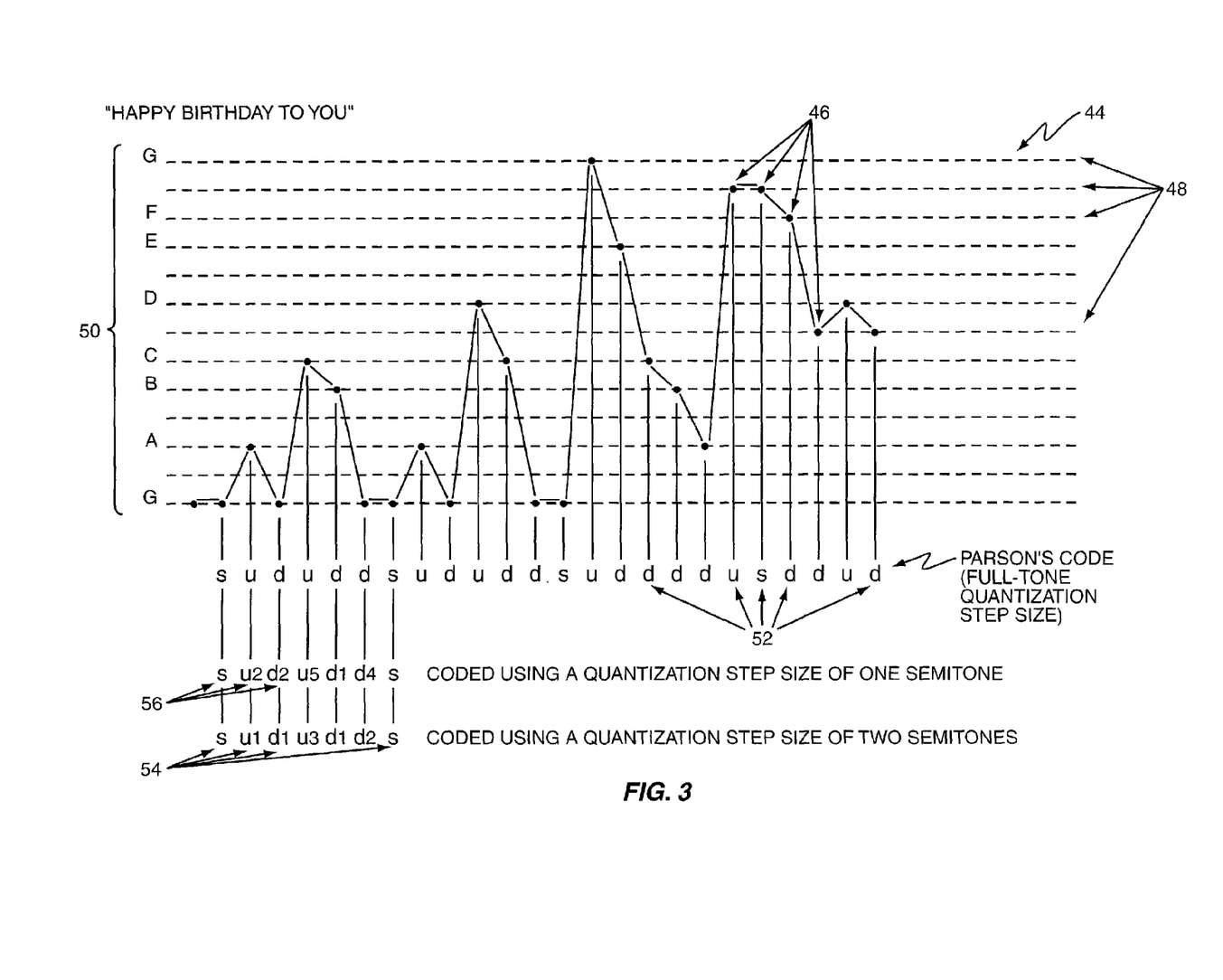
FIG. 3 is a diagram of one embodiment of a graphical depiction of a melodic contour for the melody "Happy Birthday to You," which is offered as a practical but non-limiting example of graphically depicting melodic contours corresponding to a sequence of notes.

An understanding of the above process may be better understood in the context of FIG. 3, which provides an example of melodic contour coding. As a non-limiting example, FIG. 3 provides a representation of the melody "Happy Birthday to You" and includes a non-limiting example of the graphical depiction 44 of the melodic contour for this tune. The graphical depiction 44 represents the individual notes using graphic elements 46 (points, dots, markers, etc.), and controls the relative display position of these elements to suggest the melodic contour. The graphical depiction 44 may include horizontal lines 48 or other such indicators, which improve the depiction's ability to convey the relative note interval changes between consecutively entered musical notes. The lines 48 may represent semitone gradations and thus the graphical depiction may be used to indicate the step-size note interval changes in semitones, although it may use a different scale or precision than the quantization step size used to generate the actual input melodic contour. In the illustrated embodiment, the graphical depiction includes per-semitone lines that span a full octave scale 50.

Still referring to FIG. 3, examples of three different sets of change codes are shown below the graphical depiction 44 and are identified by the reference numerals 52, 54, and 56. The set 52 results from the use of one quantization step size, meaning that the code comprises a series of up, down, or no-change indicators corresponding to the pitch differentials in the sequence of entered notes. Such encoding commonly is referred to as "Parson's" coding, and is not preferred. Melodic contour generation taught herein uses one or more sets of change codes having non-uniform step sizes for quantizing note interval changes in semitones.

With code 54, one sees the finer precision of up/down change indicators, e.g., the "u3" change in code 54 represents a pitch differential of three steps of two semitones each, while the corresponding differential in code 52 is simply denoted as "u" and therefore indicates a full note change upward. In contrast, code 56 represents full semitone precision, i.e., one semitone per up/down change step size. Thus, code 56 represents the same change represented as "u5" in contrast to the "u3" indication of code 54 and the "u" change indication of code 52. While code 56 thus represents the most accurate representation of the actual pitch changes embodied in the entered sequence of notes, it may be too sensitive to input errors by the user, and also potentially complicates database matching operations.

While not limiting, a preferred encoding method taught herein uses a set of change codes comprises storing a first up code representing an upward note interval change of one to two semitones, a second up code representing an upward note interval change of three to five semitones, and a third up code representing an upward note interval change of six or greater semitones. The same code set generally will, of course, include corresponding first, second, and third down codes, and may include one or more repeated-note codes corresponding to different numbers or ranges of repeated notes. For example, the stored change codes may include a first repeat code corresponding to two or three identical musical notes in a row, a second repeat code corresponding to four or five identical musical notes in a row, and a third repeat code corresponding to six or more identical musical notes in a row.

Providing for quantization of repeated notes in this manner simplifies the melodic contour and addresses another common source of melody input errors. That is, users often misidentify the number of repeated notes in a tune heard on the radio, or in passing, such that entering repeating sequences of notes is vulnerable to error. Thus, one or more embodiments of the computer program 12 are configured to identify repeated notes in the sequence of entered notes, and to abbreviate any such sequence using one or more repeat codes.

Figure 4:
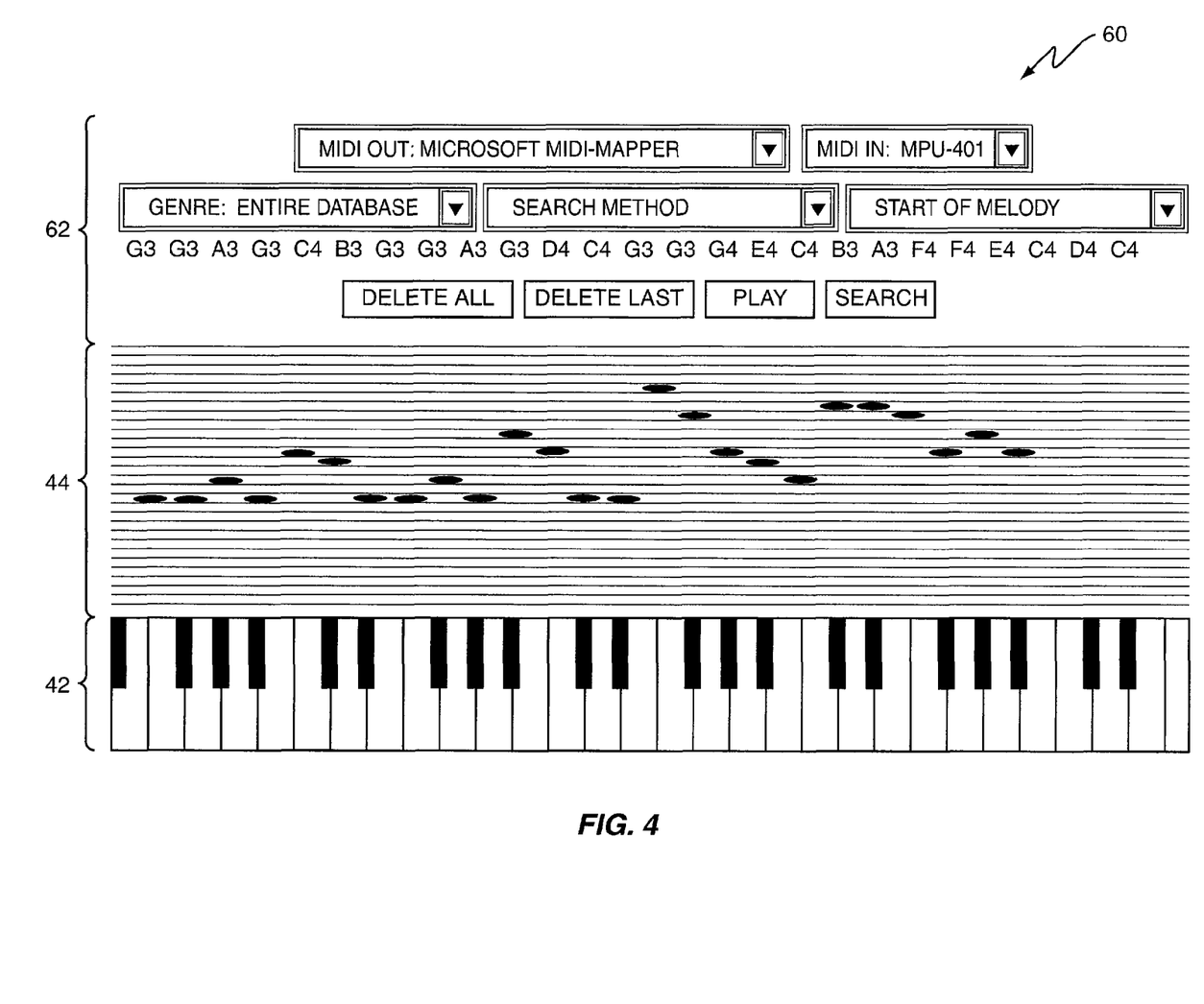
FIG. 4 is a diagram of a user interface supporting one or more embodiments of melodic contour coding.

With the above functionality in mind, FIG. 4 illustrates one embodiment of a user interface 60 that may be displayed by the computer program 12 on the display device 34 of the computer system 10. One sees that the overall user interface 60 may comprise the graphical depictions of the musical keyboard and melodic contour 42 and 44, respectively. Further, the user interface 60 may include an information and controls display 62, which may include program information output, various file, print, and other menu controls, and, in at least one embodiment, includes a text box or other text output device that allows the computer program 12 to output the sequence of entered notes as a text string. Note that in at least one embodiment the computer program 12 is configured to allow the user to edit the entered sequence of notes using this text box and, indeed, some embodiments permit the user to enter the sequence of notes directly by typing into the text box. Editing changes made to text box information can be used to update the graphical depiction of the melodic contour 44 and/or the generated melodic contour. The information and controls display 62 also may include one or more additional text boxes for receiving keywords or other data related to meta-data associated with entries in the database of melodic change codes.

In any case, in one or more embodiments, the computer program 12 is configured in one or more embodiments to support database operations, wherein the input melodic contour generated for the entered sequence of notes serves as the basis for querying a database of melodic change codes. Broadly, the database operations allow the user to enter all or part of a tune, and use the resulting input melodic contour to search for digital audio files having matching melodic contours.

That is, one embodiment of the computer program 12 is configured to search one or more databases of stored melodic contours for entries matching the input melodic contour generated from the input sequence of musical notes. The computer program 12 may search within an attached file system or memory. For example, the computer program 12 may be configured to use the file storage interface 22 shown in FIG. 1 to search local memory or attached hard drives for databases of stored melodic contours, against which the input melodic contour may be compared for matching evaluation.

Broadly, in at least one embodiment, the computer program 12 is configured to initiate a search of a melodic contour database to find digital audio files, which may be songs, ringtones, etc. having melodic contours matching the input melodic contour. In at least one such embodiment, the database of melodic change codes is remote from the computer system 10, but is accessible via the internet or other data network. For example, a remote web server may host a database of stored melodic contours, or otherwise provide query access to such a database. Thus, initiating a search of a database of stored melodic contours to find digital audio files having melodic contours matching that of the input melodic contour comprises, for at least one embodiment of the computer program 12, transmitting a search query to a remote computer system and receiving corresponding search results from the remote computer system. In one or more embodiments, transmitting that search query to a remote computer system includes transmitting search parameter information in association with the input melodic contour, and may include receiving at least a portion of the search parameter information as user input.

Whether the computer program 12 performs database searching using a locally or remotely accessed database of stored melodic contours, one or more embodiments of the computer program 12 improve such searching by restricting the search to one or more identified portions of melodic contour files or associated digital audio files. For example, the computer program 12 restricts the search to one or more identified portions of melodic contours or associated digital audio files having entries in the queried database.

Generally, the database of stored melodic contours represents the melodies of the corresponding digital audio files. A default search mode may comprise "match the start of the contours stored in the database." That is, the matching comparison logic compares the input melodic contour to the stored melodic contours in the database by aligning the beginning of the input melodic contour with the beginnings of each one of the stored melodic contours. Such search behavior generally corresponds to the expected search behavior (people enter the first notes of a melody, but not necessarily all notes. Of course, the search algorithm can use a sliding comparison approach, such as where the input melodic contour is compared across the set of contour codes comprising each stored melodic contour, to see whether the input melodic contour matches any part of each stored melodic contour. Such an approach provides a powerful "match anywhere" capability, at least in cases where the database being searched stores a complete melodic contour for the corresponding digital audio files, e.g., stores melodic contours for complete songs, including all themes, choruses, etc.

Also contemplated herein is the storing of different portions of digital audio files in different database entries, along with meta information identifying which portions are stored in which database entries. This approach enables users to match on a selective basis. For example, the user could input a melodic contour corresponding to a bridge portion of a song, and then search only for matching bridge portions in the database of stored melodic contours.

Thus, it should be understood that the input melodic contour may be compared to a database of stored melodic contours using a search anywhere approach—effectively, this means sliding the input melodic contour along individual ones of the melodic contours stored in the database, to see whether any portion matches the input melodic contour. Alternatively, or additionally, the input melodic contour may represent an identified portion of a song or other musical work for "desired portion" searching, wherein searching is restricted to comparisons involving the corresponding portions as represented in the database.

Generally, then, in at least one embodiment taught herein, the computer program 12 is configured to receive search restriction information as user input and/or to read such information from a configuration file. Further, for remote database searching, search restriction information may be transmitted by the computer program 12 as part of the search query.

Figure 5:
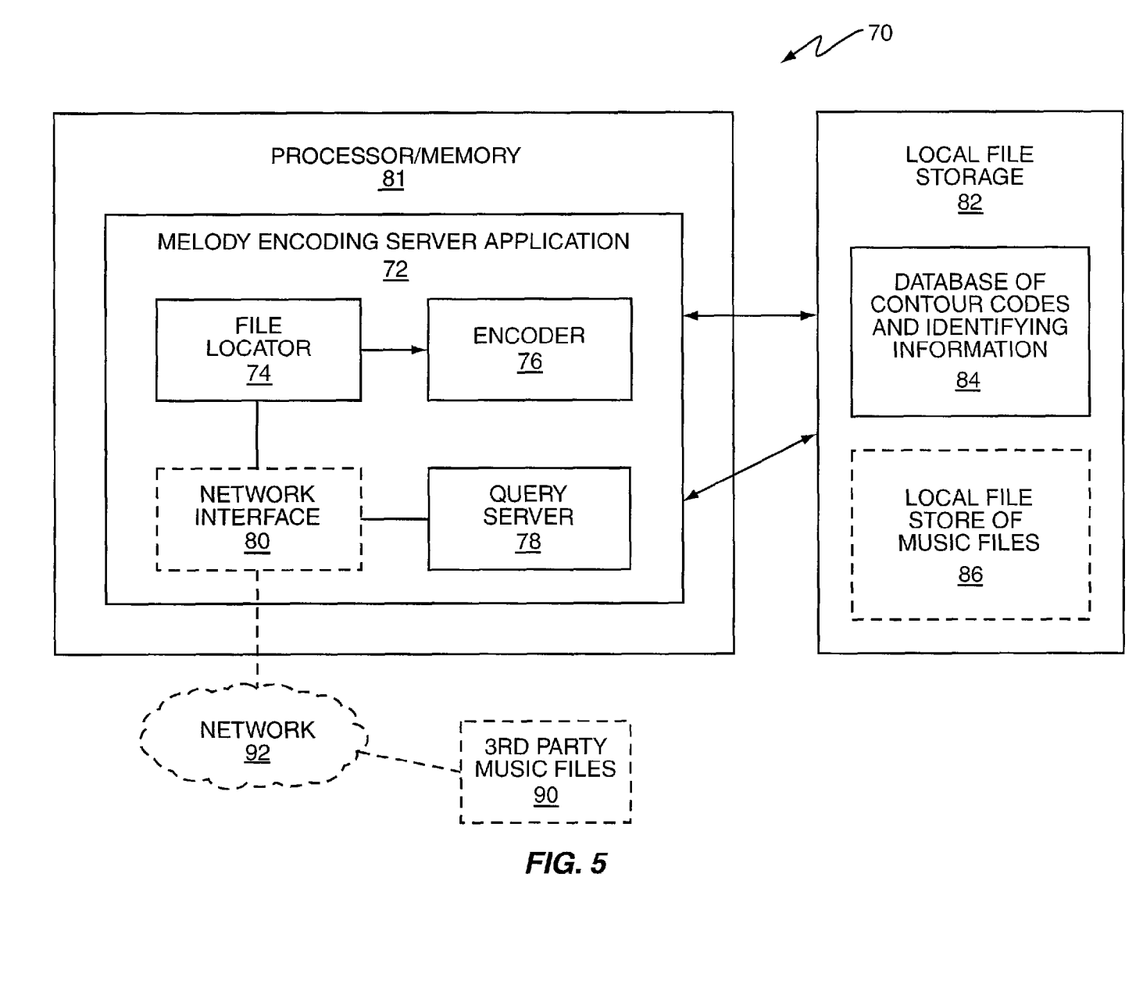
FIG. 5 is a block diagram of one embodiment of a computer program embodying a method of melodic contour database generation.

Turning from details associated with the computer program 12 and its associated melodic contour generation method, FIG. 5 illustrates a computer system 70 that is configured to execute a computer program 72, which functions as a melody encoder and matching server application suitable for deployment on a web server or other networked computer. The illustrated embodiment of the computer program 72 includes a file locator function 74, an encoder function 76, a query server function 78, and an optional network interface function 80.

These functions generally are implemented as program instructions and the computer system 70 includes processor/memory systems 81 to support execution of these instructions. The computer system 70 may include or be associated with local file storage 82, which may be used as a repository for a database 84 of stored melodic contours and associated identifying information, and which also may be used to hold a repository 86 of digital audio files. These files may represent digital audio files retrieved for melodic contour coding and may be purged after such coding, or they may represent files that are generally stored for access through the computer system 70. In other words, in at least one embodiment, the computer system 70 holds, or otherwise identifies, one or more collections of digital audio files and stores a corresponding database of stored melodic contours.

In any case, it should be understood that in one or more embodiments the melodic contour database 84 includes stored melodic contours representing melodic contours for all or portions of a number of digital audio files, whether those files are locally or remotely accessible. Further, the melodic contour database 84 includes, or at least points to, identifying information associated with the melodic contour entries in the database 84. By way of non-limiting example, associated identifying information includes one or more of the corresponding digital audio file name, song name, if applicable, artist information, copyright information, file location/network address information, etc. For example, the computer system 70 may be communicatively coupled to one or more repositories of third-party music files 90, which are accessible through a network 92, e.g., the internet. In such cases, the database 84 generally includes URL or other pointer information identifying the locations of digital audio files having entries in the melodic contour database.

Figure 6:
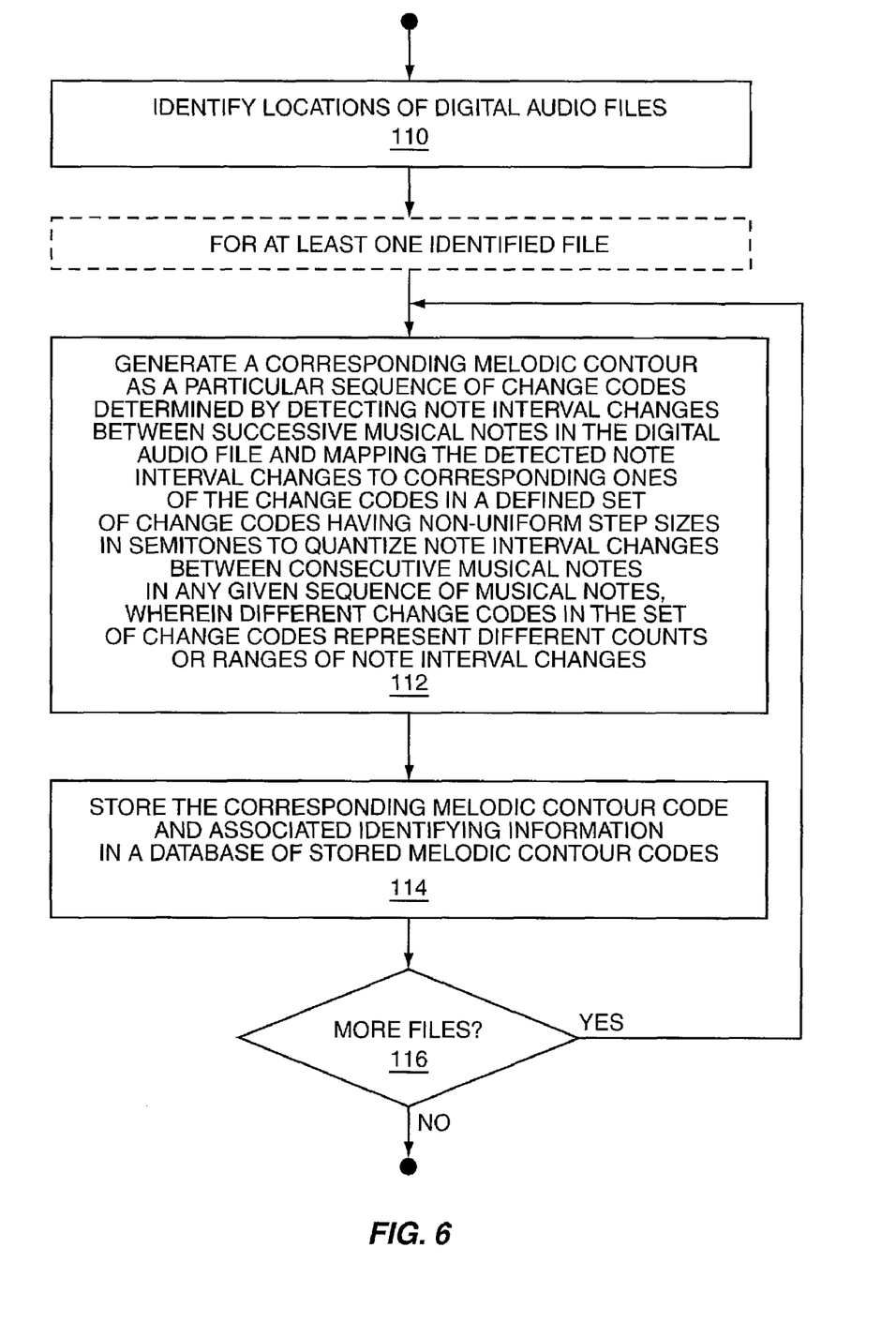
FIG. 6 is a logic flow diagram of one embodiment of processing logic for melodic contour database generation.

FIG. 6, which illustrates one embodiment of the above described melodic contour database generation, may be implemented in the computer program 72 for execution by the computer system 70. The illustrated processing begins with identifying locations of digital audio files (Step 110). For one or more such identified digital audio files, the computer program 72 generates a corresponding melodic contour for each identified digital audio file based on storing a set of change codes having non-uniform step sizes in semitones to quantize note interval changes between consecutive musical notes in any given sequence of musical notes, wherein different change codes in the set of change codes represent different counts or ranges of note interval changes. Thus, for all or a subset of note sequences represented within the digital audio file, the computer program 72 generates the corresponding melodic contour as a particular sequence of the change codes determined by detecting note interval changes between successive musical notes in the sequence of musical notes and mapping the detected note interval changes to corresponding ones of the change codes (Step 112).

Processing continues for the current digital audio file with storing the corresponding melodic contour and associated identifying information in the database of stored melodic contours 84 (Step 114). If there are more digital audio files to be processed ("YES" from Step 116), processing returns to Step 112 and repeats. Of course, identifying file locations and adding corresponding entries to the melodic contour database 84 can be performed on an ongoing basis, or at desired intervals.

In at least one embodiment of the above processing, the file locator function 74 is configured to identify the locations of digital audio files available locally and/or remotely. In one or more embodiments, the file locator function 74 locates files in potentially disparate locations based on querying internet search engines and/or crawling the web (World Wide Web) to identify file locations. Further, the file locator function 74 is, in one or more embodiments, configured to search for particular kinds of files. For example, in one embodiment it is configured to locate MIDI-based and/or RTTTL-based ring tone files and to build/maintain the database of melodic contours 84 to correspond to those files.

In that manner, remote users can submit input melodic contours to the query server 78 and it, in turn, can search the database 84 to identify ring tone files having matching melodic contour entries in the database 84. Alternatively, users may submit input sequences of musical notes, and the query server 78 generates corresponding input melodic contours therefrom, and then performs database searching accordingly. In either case, search results, e.g., matching information, can then be returned to the querying users. In at least one such embodiment, the returned results information includes a hyperlink or other information enabling a remote user to download or otherwise access the ring tone(s) or other digital audio files identified as having matching melodic contours.

Monophonic MIDI files represent one common and particularly advantageous format for ring tones and other digital audio files. The monophonic MIDI format complements the simple extraction/identification of note sequences for use in melodic contour coding. Further, monophonic melodies can be extracted from polyphonic ring tone files or MIDI files with various algorithms. For example, the channels and/or tracks in a given file can be analyzed with regards to instrument settings, polyphony, markers, pitch and/or track names, to extract monophonic melodies. Of course, other file formats may be processed for melodic contour coding. As an example, some cell phone manufacturers use specialized file structures to store ring tones. With knowledge of the file formats involved and any necessary licensing agreements in place, the encoder 76 can be configured to extract note sequences from virtually any format of ring tone or other structured audio file.

Such flexibility enables a variety of business models. For example, it is contemplated herein that a third party maintains a repository of digital audio files 90 that are of general or specific interest, and remits payment to the operator of the computer system 70. That is, users submit melodic contour queries, whether expressed as the raw input sequence of musical notes or as pre-encoded melodic contours, to the query server function 78 of the computer program 72. In turn, the query server 78 provides users with identifying information indicating the particular files in the repository 90 that have matching entries in the melodic contour database 84. As such, download/purchase traffic is directed to the third party. Of course, other business arrangements based on the melodic contour matching services provided by the computer program 72 are contemplated herein.

More generally, those skilled in the art will appreciate that at least one embodiment of the present invention broadly contemplates "client" computer systems 10, which may be mobile computers, running copies of the computer program 12, such that remote users can conveniently enter sequences of notes, generate corresponding melodic change codes, and submit queries to the computer system 70. In turn, the computer system 70 runs a copy of the computer program 72 and therefore operates as a web-based melodic contour search service, allowing remote users to submit melodic change codes in search queries and returning corresponding search results in response to those queries. As such, users can determine the locations of digital audio files that have matching melodic contours in the database 84. Further, those skilled in the art will recognize that the computer program 12 can be configured to perform database generation and/or database searching with or without the assistance of a remote computer system 70 running the computer program 72.

Notably, in at least one embodiment, the computer program 12 is configured for operation on one or more types of mobile computer devices, such as digital audio players or cellular telephones/PDAs. For example, in one embodiment the computer system 10 comprises a mobile station or other wireless communication device, such as a PDA, and the computer program 12 is configured for operation on the mobile station. As such, a user of the mobile station can search one or more networks available through the mobile station's wireless communication link for melody information. In at least one such embodiment, the mobile station user advantageously uses the computer program 12 to search for ring tones and other downloadable audio content based on melodic contour searching.

In a further embodiment, melody encoding and searching as taught herein may be incorporated into other search tools. For example, in one embodiment, melody contour coding and searching is incorporated into one or more Internet search engines, such as GOOGLE. As such, at least one embodiment of the computer program 12 comprises an applet or other application that enables web users to enter melody change codes for searching/matching operations.

In still other embodiments, the computer program 72 is configured to receive sequences of entered notes from users, and perform the corresponding melodic contour coding based on the input sequences. For example, one such method of melody-based searching comprises receiving data representing a sequence of notes from a remote computer system, generating an input melodic contour by quantifying note interval changes between consecutive musical notes in the sequence using non-uniform step sizes, identifying matching melodic change codes by comparing the input melodic contour to a database of stored melodic change codes, and returning matching information to the remote computer system.

Thus, computer program 72 may be configured to receive note sequences, perform melodic contour coding, and perform comparison matching. As such, the steps of receiving, generating, identifying, and returning may be performed at a web server accessible via the Internet. One advantage to this embodiment is simplification of the client-end software. For example, the computer program 12 need only provide graphical interface and note capture capabilities, rather than implementing the full melodic contour encoding process.

Whether implemented on a single computer system searching local or remote databases of stored melodic contours, or implemented on a networked computer system operative to act as a melody search engine for a plurality of remote users, melodic contour coding as taught herein enables a robust and accurate method of generating an input melodic contour from an entered sequence of musical notes, and comparing that input melodic contour to one or more databases of compatibly-encoded melodic contours corresponding to any number and types of digital audio files.

In at least one such embodiment, the method of melody matching based on melodic contours comprises defining the melodic contour for any given sequence of musical notes as the corresponding sequence of change codes selected from a defined set of change codes having non-uniform step sizes that quantize note interval changes between consecutive musical notes in the given sequence of musical notes. The method further includes comparing an input melodic contour for an input sequence of musical notes to a database of stored melodic contours to determine matching information indicating whether or to what extent the input melodic contour matches one or more of the stored melodic contours, and providing the matching information to a user associated with the input melodic contour. The method may further include receiving the input sequence of musical notes as input from the user, and generating the input melodic contour by detecting the note interval changes between consecutive musical notes in the input sequence of musical notes and mapping the detected note interval changes to corresponding change codes in the defined set of change codes.

Further, in one or more embodiments, the input melodic contour comprises a high-resolution input melodic contour and a low-resolution input melodic contour. With that, comparing an input melodic contour for an input sequence of musical notes to a database of stored melodic contours to determine matching information indicating whether or to what extent the input melodic contour matches one or more of the stored melodic contours comprises, for a narrow matching search, comparing the high-resolution input melodic contour to a database of stored high-resolution melodic contours. For a broad matching search, the method includes comparing the low-resolution input melodic contour to a database of stored low-resolution melodic contours, or to low-resolution versions of high-resolution stored melodic contours derived from the database of stored high-resolution melodic contours.

To support differing resolutions, the defined set of change codes can include a high-resolution set and a low-resolution set, for generating one or both of a high-resolution melodic contour and a low-resolution melodic contour, based on the given sequence of musical notes. As such, comparing an input melodic contour for an input sequence of musical notes comprises, for a high-resolution input melodic contour, comparing the high-resolution input melodic contour to a database of stored high-resolution melodic contours. Likewise, for a low-resolution input melodic contour, the method includes comparing the low-resolution input melodic contour to a database of stored low-resolution melodic contours, or to low-resolution versions of stored melodic contours in a database of stored high-resolution melodic contours.

More broadly, comparing an input melodic contour for an input sequence of musical notes comprises comparing a high-resolution input melodic contour to a database of high-resolution stored melodic contours and, on a selective basis, generating a low-resolution input melodic contour from the high-resolution input melodic contour and comparing the low-resolution input melodic contour to a database of stored low-resolution melodic contours, or to low-resolution versions of melodic contours from the database of stored high-resolution melodic contours. Such embodiments may include determining the selective basis as a function of an indication of a desired search type indicator that indicates whether narrow or broad searching is desired, or as a function of evaluating search results obtained from comparing the high-resolution input melodic contour to the database of stored high-resolution melodic contours. That is, there may be a received or configured indicator, indicating whether broad or narrow searching is desired, or it may be determined that narrow searching has not produced meaningful matching results.

Regardless of whether differing resolutions are used, matching also may be based on matching the input melodic contour to specific portions or segments of the stored melodic contours, or may be based on general "match anywhere" criteria. Thus, in at least one embodiment, comparing an input melodic contour for an input sequence of musical notes to a database of stored melodic contours to determine matching information indicating whether or to what extent the input melodic contour matches one or more of the stored melodic contours comprises comparing the input melodic contour to a specified segment or part of the melodic contours in the database of stored melodic contours, such as one of a chorus or a bridge or a theme segment.

In other embodiment, comparing an input melodic contour for an input sequence of musical notes to a database of stored melodic contours to determine matching information indicating whether or to what extent the input melodic contour matches one or more of the stored melodic contours comprises, as a default search approach, aligning the beginning of the input melodic contour with the beginnings of melodic contours in the database of stored melodic contours for comparison purposes.

In one or more embodiments supporting aligned searching, the database of stored melodic contours includes separately stored segments or parts of longer, complete melodic contours, so that the input melodic contour can be compared to the appropriate segments of stored melodic contours. Thus, where the database of stored melodic contours includes separately stored segments representing selected parts of longer melodic contours, comparing the input melodic contour to a specific segment or part of the melodic contours in the database of stored melodic contours may comprise comparing the input melodic contour to particular ones of the segments. Here, "particular ones" of the stored segments indicates the segments corresponding to the desired parts or portions of the longer melodic contours to be searched against, which may be indicated by received search information.

Also, in at least one embodiment where beginning-to-beginning comparisons are the default, the method may further comprise, in response to a configuration setting or a received indication, overriding the default search approach, such that comparing the input melodic contour for the input sequence of musical notes to a database of stored melodic contours to determine matching information indicating whether or to what extent the input melodic contour matches one or more of the stored melodic contours comprises offsetting the beginning of the input melodic contour with respect to the beginnings of the melodic contours in the database of melodic contours for comparison purposes. That is, the beginning of the input melodic contour can be offset relative to the beginning of a possibly longer stored melodic contour for purposes of the comparison.

Alternatively, or additionally, at least one embodiment supports "match anywhere" searching. With "match anywhere" searching, the input melodic contour is compared across the entire length of a stored melodic contour, to determine whether the input melodic contour matches any portion of the stored melodic contour.

In any case, the method may also include maintaining the database of stored melodic contours based on searching Internet-accessible computer systems for stored audio files, and generating corresponding melodic contours for one or more such stored audio files, for storage in the database of stored melodic contours. Further, the method may include storing audio file information for audio files for which melodic contours are generated, and including some or all of the stored audio file information for matching melodic contours in the matching information. Maintaining the database also may include maintaining Uniform Resource Locator (URL) information for one or more of the audio files represented in the database of stored melodic contours.

The above method, or variations of it, may be used to implement a commercially-advantageous system for melody matching that comprises means for maintaining a database of stored melodic contours, means for converting an input sequence of musical notes entered by a user into a corresponding input melodic contour based on detecting note interval changes between consecutive musical notes in the input sequence of musical notes and mapping the detected note interval changes to corresponding ones in a defined set of change codes having non-uniform step sizes for quantizing note interval changes, means for generating matching information based on comparing the input melodic contour to the database of stored melodic contours, and means for providing the matching information to the user.

The foregoing means comprise the computer 10 executing a version of the computer program 12, and/or may comprise the computer 70 executing a version of the computer program 72. For example, in at least one embodiment, the system includes a networked melody searching computer accessible by remote computers over a computer network. In such instances, the means for converting the input sequence of musical notes may be computer software executing at one or more of the remote computers. Alternatively, such means may be computer software executing at the networked melody searching computer, such that the networked melody searching computer has means for receiving input sequences of musical notes from one of the one or more remote computers. These received sequences may then be converted into corresponding input melodic contours for comparison matching against one or more databases of stored melodic contours.

With these and other embodiments in mind, the present invention is not limited by the foregoing discussion or by the accompanying drawings. Indeed, the present invention is limited only by the following claims and their legal equivalents.

What is claimed is:

1. A method of generating a melodic contour comprising:
   storing a set of change codes having non-uniform step sizes in semitones to quantize note interval changes between consecutive musical notes in any given sequence of musical notes, wherein different change codes in the set of change codes represent different counts or ranges of note interval changes;
   receiving an input sequence of musical notes; and
   generating the melodic contour as a particular sequence of the change codes determined by detecting note interval changes between successive musical notes in the input sequence of musical notes and mapping the detected note interval changes to corresponding ones of the change codes;
   wherein storing the set of change codes comprises storing a first up code representing an upward note interval change of one to two semitones, a second up code representing an upward note interval change of three to five semitones, and a third up code representing an upward note interval change of six or greater semitones, and further comprises storing corresponding first, second, and third down codes.

2. A method of generating a melodic contour comprising:
   storing a set of change codes having non-uniform step sizes in semitones to quantize note interval changes between consecutive musical notes in any given sequence of musical notes, wherein different change codes in the set of change codes represent different counts or ranges of note interval changes;

receiving an input sequence of musical notes; and generating the melodic contour as a particular sequence of the change codes determined by detecting note interval changes between successive musical notes in the input sequence of musical notes and mapping the detected note interval changes to corresponding ones of the change codes;

wherein storing the set of change codes comprises storing a first subset of change codes corresponding to upward note interval changes, and a second subset of change codes mirroring the step sizes of the first subset of change codes but corresponding to downward note interval changes;

wherein storing the set of change codes further comprises storing one or more repeat codes, each repeat code representing a different number or range of consecutively repeated musical notes; and wherein storing one or more repeat codes comprises storing a first repeat code corresponding to two to three identical musical notes in a row, storing a second repeat code corresponding to four to five identical musical notes in a row, and storing a third repeat code corresponding to six or more identical musical notes in a row.

3. A method of generating a melodic contour comprising:

storing a set of change codes having non-uniform step sizes in semitones to quantize note interval changes between consecutive musical notes in any given sequence of musical notes, wherein different change codes in the set of change codes represent different counts or ranges of note interval changes;

receiving an input sequence of musical notes; and generating the melodic contour as a particular sequence of the change codes determined by detecting note interval changes between successive musical notes in the input sequence of musical notes and mapping the detected note interval changes to corresponding ones of the change codes;

wherein storing the set of change codes comprises storing two different sets of change codes, including a higher-resolution set and a lower-resolution set, and wherein generating the melodic contour comprises using the higher-resolution set of change codes to generate a higher-resolution input melodic contour from the input sequence of musical notes and using the lower-resolution set of change codes to generate a lower-resolution input melodic contour from the input sequence of musical notes or from the higher-resolution input melodic contour.

4. The method of claim 3, further comprising performing higher-resolution comparison matching by comparing the higher-resolution input melodic contour with one or more of higher-resolution stored melodic contours in a database of stored melodic contours, and performing lower-resolution comparison matching by comparing the lower-resolution input melodic contour with one or more of lower-resolution stored melodic contours in a same or different database of stored melodic contours.

5. The method of claim 3, further comprising performing lower-resolution comparison matching by comparing the lower-resolution input melodic contour with one or more lower-resolution versions of high-resolution stored melodic contours derived from a database of stored high-resolution melodic contours.

6. A method of generating a melodic contour comprising:

storing a set of change codes having non-uniform step sizes in semitones to quantize note interval changes between consecutive musical notes in any given sequence of musical notes, wherein different change codes in the set of change codes represent different counts or ranges of note interval changes;

receiving an input sequence of musical notes; and generating the melodic contour as a particular sequence of the change codes determined by detecting note interval changes between successive musical notes in the input sequence of musical notes and mapping the detected note interval changes to corresponding ones of the change codes;

wherein storing the set of change codes comprises storing a first subset of up and down change codes comprising a higher resolution first set of step sizes for quantizing note interval changes and storing a second subset of up and down change codes comprising a lower resolution second set of step sizes for quantizing note interval changes.

7. The method of claim 6, wherein generating the melodic contour comprises using the first subset of change codes to generate the melodic contour as a relatively high resolution melodic contour for narrow melody matching with a database of stored melodic contours and selectively mapping the relatively high resolution melodic contour into a relatively low resolution melodic contour based on the second subset of change codes for broad melody matching with the database of stored melodic contours.

8. A method of melody matching based on melodic contours comprising:

defining the melodic contour for any given sequence of musical notes as the corresponding sequence of change codes selected from a defined set of change codes having non-uniform step sizes that quantize note interval changes between consecutive musical notes in the given sequence of musical notes;

comparing an input melodic contour for an input sequence of musical notes to a database of stored melodic contours to determine matching information indicating whether or to what extent the input melodic contour matches one or more of the stored melodic contours; and providing the matching information to a user associated with the input melodic contour:

wherein the input melodic contour comprises a high-resolution input melodic contour and a low-resolution input melodic contour, and wherein comparing an input melodic contour for an input sequence of musical notes to a database of stored melodic contours to determine matching information indicating whether or to what extent the input melodic contour matches one or more of the stored melodic contours comprises, for a narrow matching search, comparing the high-resolution input melodic contour to a database of stored high-resolution melodic contours, and comprises, for a broad matching search, comparing the low-resolution input melodic contour to a database of stored low-resolution melodic contours, or to low-resolution versions of high-resolution stored melodic contours derived from the database of stored high-resolution melodic contours.

9. A method of melody matching based on melodic contours comprising:

defining the melodic contour for any given sequence of musical notes as the corresponding sequence of change codes selected from a defined set of change codes having non-uniform step sizes that quantize note interval changes between consecutive musical notes in the given sequence of musical notes;

comparing an input melodic contour for an input sequence of musical notes to a database of stored melodic contours to determine matching information indicating whether or to what extent the input melodic contour matches one or more of the stored melodic contours; and providing the matching information to a user associated with the input melodic contour;

wherein the defined set of change codes include a high-resolution set and a low-resolution set, for generating one or both a high-resolution melodic contour and a low-resolution melodic contour, based on the given sequence of musical notes.

10. The method of claim 9, wherein comparing an input melodic contour for an input sequence of musical notes comprises, for a high-resolution input melodic contour, comparing the high-resolution input melodic contour to a database of stored high-resolution melodic contours, and, for a low-resolution input melodic contour, comparing the low-resolution input melodic contour to a database of stored low-resolution melodic contours, or to low-resolution versions of stored melodic contours in a database of stored high-resolution melodic contours.

11. The method of claim 9, wherein comparing an input melodic contour for an input sequence of musical notes comprises comparing a high-resolution input melodic contour to a database of high-resolution stored melodic contours and, on a selective basis, generating a low-resolution input melodic contour from the high-resolution input melodic contour and comparing the low-resolution input melodic contour to a database of stored low-resolution melodic contours, or to low-resolution versions of melodic contours from the database of stored high-resolution melodic contours.

12. The method of claim 11, further comprising determining the selective basis as a function of an indication of a desired search type indicator that indicates whether narrow or broad searching is desired, or as a function of evaluating search results obtained from comparing the high-resolution input melodic contour to the database of stored high-resolution melodic contours.

13. The method of claim 9, wherein comparing an input melodic contour for an input sequence of musical notes to a database of stored melodic contours to determine matching information indicating whether or to what extent the input melodic contour matches one or more of the stored melodic contours comprises comparing the input melodic contour to a specified segment or part of the melodic contours in the database of stored melodic contours.

14. The method of claim 13, wherein the specified segment or part of the melodic contours in the database of stored melodic contours comprises one of a chorus or a bridge or a theme segment.

15. The method of claim 13, wherein the database of stored melodic contours includes separately stored segments representing selected parts of longer melodic contours, and wherein comparing the input melodic contour to a specific segment or part of the melodic contours in the database of stored melodic contours comprises comparing the input melodic contour to particular ones of the segments.

16. The method of claim 9, wherein comparing an input melodic contour for an input sequence of musical notes to a database of stored melodic contours to determine matching information indicating whether or to what extent the input melodic contour matches one or more of the stored melodic contours comprises, as a default search approach, aligning the beginning of the input melodic contour with the beginnings of melodic contours in the database of stored melodic contours for comparison purposes.

17. The method of claim 16, further comprising, in response to a configuration setting or a received indication, overriding the default search approach, such that comparing the input melodic contour for the input sequence of musical notes to a database of stored melodic contours to determine matching information indicating whether or to what extent the input melodic contour matches one or more of the stored melodic contours comprises offsetting the beginning of the input melodic contour with respect to the beginnings of the melodic contours in the database of stored melodic contours for comparison purposes.

18. The method of claim 16, further comprising, in response to a configuration setting or a received indication, overriding the default search approach, such that comparing the input melodic contour for the input sequence of musical notes to a database of stored melodic contours to determine matching information indicating whether or to what extent the input melodic contour matches one or more of the stored melodic contours comprises performing a "match anywhere" comparison of the input melodic contour with respect to the melodic contours in the database of stored melodic contours.

19. The method of claim 9, further comprising maintaining the database of stored melodic contours based on searching Internet-accessible computer systems for stored audio files, and generating corresponding melodic contours for one or more such stored audio files, for storage in the database of stored melodic contours.

20. The method of claim 19, further comprising storing audio file information for audio files for which melodic contours are generated, and including some or all of the stored audio file information for matching melodic contours in the matching information.

21. The method of claim 19, wherein maintaining the database of stored melodic contours includes maintaining Uniform Resource Locator (URL) information for one or more of the audio files represented in the database of stored melodic contours.

22. The method of claim 9, further comprising displaying a graphical representation of a musical keyboard and receiving the input sequence of musical notes based on user input directed to the graphical representation of the musical keyboard.

23. The method of claim 22, further comprising generating the input melodic contour by detecting the note interval changes between consecutive musical notes in the input sequence of musical notes and mapping the detected note interval changes to corresponding change codes in the defined set of change codes.

24. The method of claim 23, further comprising displaying a graphical representation of the input melodic contour as generated from the input sequence of musical notes.

25. The method of claim 9, further comprising monitoring a MIDI port of a computer for incoming data representative of the input sequence of musical notes, and generating the input melodic contour by detecting the note interval changes between consecutive musical notes in the input sequence of musical notes and mapping the detected note interval changes to corresponding change codes in the defined set of change codes.

* * * * *